(12) United States Patent
Yamaguchi et al.

(10) Patent No.: US 8,992,665 B2
(45) Date of Patent: Mar. 31, 2015

(54) METAL RECOVERY METHOD AND DIALYSIS DEVICE

(75) Inventors: Yoshihide Yamaguchi, Yokohama (JP); Takehiko Hasebe, Suita (JP); Yasuko Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 13/574,253

(22) PCT Filed: Nov. 19, 2010

(86) PCT No.: PCT/JP2010/006783
§ 371 (c)(1),
(2), (4) Date: Jul. 20, 2012

(87) PCT Pub. No.: WO2011/104798
PCT Pub. Date: Sep. 1, 2011

(65) Prior Publication Data
US 2012/0312126 A1  Dec. 13, 2012

(30) Foreign Application Priority Data

Feb. 23, 2010 (JP) .................................. 2010-036785
Jun. 21, 2010 (JP) .................................. 2010-140107

(51) Int. Cl.
*C22B 26/12* (2006.01)
*C22B 5/00* (2006.01)
(Continued)

(52) U.S. Cl.
CPC ............. *C22B 26/12* (2013.01); *B01D 61/246* (2013.01); *C22B 7/006* (2013.01); *C22B 7/007* (2013.01); *H01M 10/54* (2013.01); *B01D 61/30* (2013.01); *B01D 63/16* (2013.01); *B01D 2315/02* (2013.01)

USPC ................ 75/711; 75/743; 75/745; 210/205; 210/321.71; 210/660; 210/681

(58) Field of Classification Search
CPC ...... B01D 61/246; B01D 61/30; B01D 61/16; C22B 7/007; C22B 26/12; C22B 3/06; H01M 10/54
USPC ............... 75/743, 711, 745; 210/205, 321.71, 210/660, 681
See application file for complete search history.

(56) References Cited

FOREIGN PATENT DOCUMENTS

GB          857688 A   *  2/1957
JP     2001-508925 A     7/2001
(Continued)

OTHER PUBLICATIONS

Machine translation of JP 2000-015216 published Jan. 2000 by Hayashi et al.*

(Continued)

*Primary Examiner* — George Wyszomierski
*Assistant Examiner* — Tima M McGuthry Banks
(74) *Attorney, Agent, or Firm* — Crowell & Moring LLP (57) ABSTRACT

Provided is a valuable-metal recovery method for recovering metals from lithium ion batteries using comparatively simple equipment and without using a cumbersome process. In said method, a positive electrode material from lithium ion batteries, containing lithium and a transition metal, is dissolved in an acidic solution, thereby generating lithium ions and ions of the transition metal in the acidic solution. Said acidic solution and a recovery liquid are then made to flow with an anion-permeable membrane interposed therebetween, causing the lithium ions to permeate from the acidic solution to recovery solution. Lithium ions are then recovered from the recovery liquid containing dissolved lithium ions.

23 Claims, 4 Drawing Sheets

(51) Int. Cl.
*B01D 61/24* (2006.01)
*C22B 7/00* (2006.01)
*H01M 10/54* (2006.01)
*B01D 61/30* (2006.01)
*B01D 63/16* (2006.01)

(56) References Cited

FOREIGN PATENT DOCUMENTS

| | | |
|---|---|---|
| JP | 2002-167628 A | 6/2002 |
| JP | 3675392 B2 | 7/2005 |
| JP | 2009-269810 A | 11/2009 |

OTHER PUBLICATIONS

Machine translation of JP 2009-269810 published Nov. 2009 by Kuribayashi.*
Machine translation of JP 2009-270189 published Nov. 2009 by Kuribayashi.*
Abstract of JP 2000-015216 published Jan. 2000 by Hayashi et al.*
Abstract of JP 2009-270189 published Nov. 2009 by Kuribayashi.*
Abstact of JP 2009-269810 published Nov. 2009 by Kuribayashi.*
Jinqiu Xu et al., "A Review of Processes and Technologies for the Recycling of Lithium-Ion Secondary Batteries", Journal of Power Sources, 2008, pp. 512-527, vol. 177.
International Search Report including English language translation dated Feb. 15, 2011 (Two (2) pages).

* cited by examiner

METAL RECOVERY METHOD AND DIALYSIS DEVICE

TECHNICAL FIELD

The present invention relates to a metal recovery method for easily recovering metals from batteries.

BACKGROUND ART

In recent years, with the progress of portability enhancement of electronic devices, the use amount of secondary batteries is rapidly increasing. Application of secondary batteries spreads over not only devices with small electricity consumption such as cellular mobile phones and portable audio players but also equipment that requires high output power such as electric tools, electric motor-assisted bicycles and electric automobiles, and attention is focused on lithium ion batteries, which are capable of obtaining high energy density. Due to the increased application of lithium ion batteries to high output power devices, the necessity to recover valuable materials from spent batteries increases, and there are various techniques proposed for recovering valuable metals from lithium ion batteries.

For instance, in Non Patent Literature 1 (the first prior art), special features on recycling technologies of lithium ion batteries are reported, and methods for recovering valuable metals constituting lithium ion batteries are systematically described. According to a typical recycling method described in Non Patent Literature 1, for example, after mechanical processings such as opening, disassembling and grinding of spent lithium ion batteries, valuable metals in the batteries are dissolved by acid leaching, and then the desired constituents are each separately precipitated using a difference in solubility properties of the constituents, or desired valuable metals are each separately recovered by a treatment that desired constituents are preferentially extracted with solvents, or the like.

Further, in Patent Literature 1 (the second prior art), there is disclosed a technique where Cu and Co are recovered by using electrolysis with diaphragm in which a liquid containing dissolved valuable metals obtained by acid leaching is used as a catholyte, and a cation exchange membrane is used as a diaphragm.

Patent Literature

Patent Literature 1: Japanese Patent No. 3675392

Non Patent Literature

Non Patent Literature 1: Jinqiu Xu et al., "A review of processes and technologies for the recycling of lithium-ion secondary batteries", Journal of Power Sources, vol. 177, pp. 512

SUMMARY OF INVENTION

Problem to be Solved by Invention

Non Patent Literature 1 (the first prior art) aims to achieve both improvement in recovery percentage of valuable materials and an increase in purity of recovered materials by various contrivances; however, there is plenty room for improvement in the complicated processes and in that a huge amount of spending on new plant and equipment is necessary for processing a large amount of waste batteries.

Further, Patent Literature 1 (the second prior art), specifically, uses equipment utilizing ion selectivity possessed by cation exchange membranes (diaphragm cell shown in FIG. 2 of Patent Literature 1) and diffusion dialysis equipment (schematic diagram not provided) utilizing anion selectivity of anion selectively permeable membranes. More specifically, primary valuable metals can be recovered by a series of treatments of electrodeposition recovery of Cu by electrolysis with diaphragm→pH adjustment→electrodeposition recovery of Co by electrolysis with diaphragm→pH adjustment→recovery of precipitates of Fe(OH)3 and Al(OH)3→recovery of Li2CO3 by addition of carbonate. According to this technique, high-purity metals can be obtained because Cu (divalent ion) and Co (trivalent ion) are electrochemically reduced and recovered; however, in the case where a large amount of waste batteries are processed, there is a room for improvement in that a huge quantity of application of electricity is necessary.

For instance, to recover about 100 kg of Co, it is necessary to continue feeding 1 ampere of current for about 100 hours, but before that, application of almost equivalent amount of electricity is also needed for electrodeposition of Cu, and thus it takes time and effort to recover all the metals through electrolysis with diaphragm alone. Moreover, the amount of liquid increases during the multiple steps of pH adjustment, and thus when Li2CO3 is recovered in the final step of the series of treatments, the concentration of Li has already lowered. Therefore, it is considered that the recovery percentage of Li does not necessarily increase even if carbonate is added. This is because lithium carbonate has a saturation solubility as high as 1.3 wt % at 20° C., and thus the amount of unrecovered constituents increases with increasing the amount of the liquid. To avoid this, there is a need to add a treatment such as a concentration step. Further, since there is a tendency that Fe(OH)3 and Al(OH)3 become gelatinous in an aqueous solution which is weakly acidic to neutral, it is not easy to operate the step of filtration/recovering of Fe(OH)3 and Al(OH)3 based on the technique of Patent Literature 1. Meanwhile, if the liquid is diluted to facilitate the filtration/recovering procedures, the recovery percentage of Li lowers. In addition, since gelatinous precipitates of Fe(OH)3 and Al(OH)3 have characteristics of adsorbing Li ions on their surfaces, it is also difficult to greatly improve the recovery percentage of Li, from this viewpoint.

Solution for Solving Problem

Typical inventions disclosed in the present application are outlined as follows.

(1) A metal recovery method comprising: a dialysis treatment step of subjecting a positive electrode material containing lithium and a transition metal element to dialysis in a bath, in which an anion selectively permeable membrane for selectively permeating lithium and an acid solution are provided.

(2) A metal recovery method comprising: a dialysis treatment step of subjecting a positive electrode material containing a composite oxide of lithium and a transition metal element to dialysis in a bath, in which an anion selectively permeable membrane for selectively permeating the lithium in the positive electrode material and an acid solution containing halide ions are provided.

Advantages of Invention

According to the present invention, it is possible to provide a valuable metal recovery method for easily recovering valuable metals from batteries.

DESCRIPTION OF PREFERRED EMBODIMENTS

Hereinafter, embodiments for carrying out the present invention will be described. Note that when the present invention is described using drawings, each component constituting drawings is provided with each reference numeral for explanation, but in the case where the same function is indicated, reference numerals and explanation may be omitted. In addition, the size of each component illustrated in the drawings may not be necessarily identical to a contraction scale reflecting its actual size of each component.

EXAMPLE 1

In the course of further testing of the aforementioned first patent technique with a view toward exploring an improvement for the technique (the first patent technique) described in the publication, the present inventors found out that lithium ions can be selectively permeated through an anion selectively permeable membrane under specific conditions, although they are monovalent cations, and accomplished the present invention by applying the phenomenon.

That is, in the method of the present invention, firstly, waste lithium ion batteries are subjected to grinding and sieving treatments to preliminarily remove a housing, packing/safety valves, circuit elements, separators, current collectors and the like, and then valuable metals constituting the lithium ion batteries are dissolved using a mineral acid containing halide ions (acid leaching). An acid solution containing halide ions and valuable metals thus obtained is subjected to filtration as required, and then subjected to an ion dialysis treatment using an anion selectively permeable membrane, thereby recovering part of the acids and lithium ions permeated through the anion selectively permeable membrane. The principle of the occurrence of the phenomenon that lithium ions, which are monovalent cations, can permeate an anion selectively permeable membrane has not yet been clarified; however, the inventors presume that this is because some interaction occurred between lithium ions in the aqueous solution containing halide ions and the plurality of halide ions. It is presumed that because lithium ions have small ion radii and high charge density, the hydration structure tends to be stabilized by the existence in proximity of halide ions, which are ion species having large polarization. Note that in the present invention, acid and Li are separated from each other by using a so-called acid retardation method, where constituents are separated by utilizing the Donnan membrane effect of an anion exchange resin column. In the course of the ion dialysis treatment, part of Co may also leak out; however, because the concentration of Co is lower than that of Li, they are separated from each other through use of a time difference in elution between Co and Li during the course of an acid retardation treatment.

In a residue liquid obtained after selectively removing Li through the ion dialysis, polyvalent transition metals that are used as component materials of the lithium ion batteries, such as Co, Mn and Ni are dissolved in a state where the polyvalent transition metals are more concentrated than those before dialysis. In order to separate respective elements from each other and recover them from this residue liquid on an element basis, various methods can be used, and it is possible to use electrolysis with diaphragm, recovering precipitates of hydroxides through neutralization (pH=6 to 9), or a method using these methods in combination.

Figure 1:
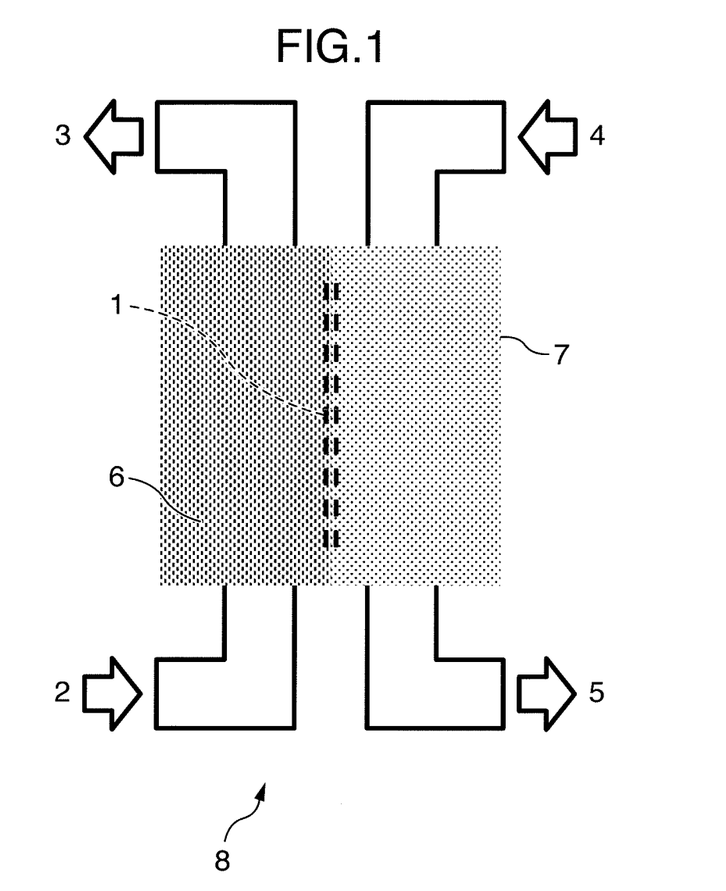
FIG. 1 is a block diagram of an example of a valuable metal recovery device according to the present invention.

The valuable metal recovery method according to the present invention will be described using FIGS. 1 and 2. FIG. 1 is a block diagram of one example of an embodiment of a valuable metal recovery device according to the present invention, and FIG. 2 is a flow diagram for illustrating a valuable metal recovery method according to the present invention.

Figure 2:
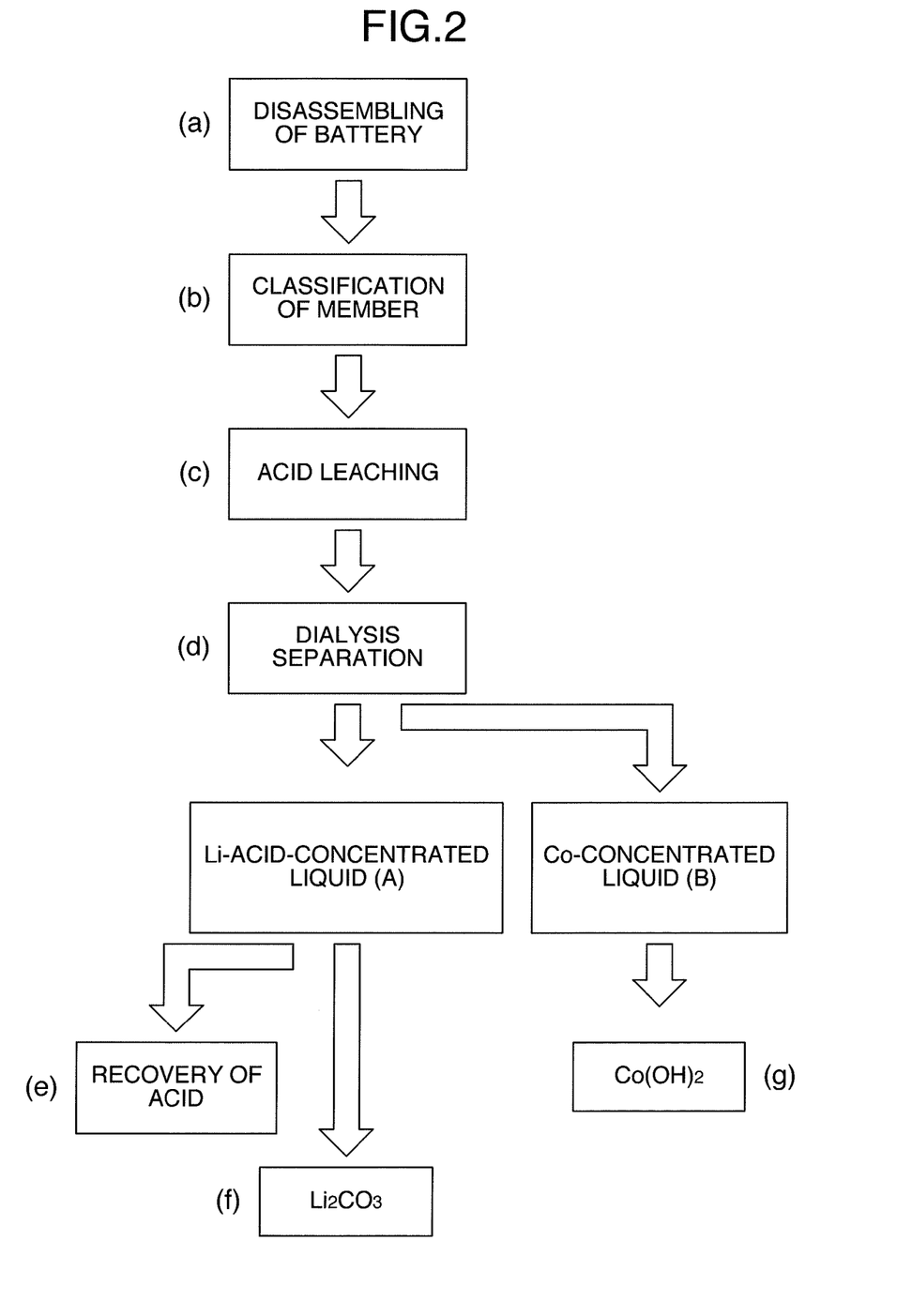
FIG. 2 is a diagram for illustrating first and second examples of a valuable metal recovery method according to the present invention.

FIG. 2 is an outlined process flow of the present invention for recovering valuable metals from waste lithium batteries (referred to as waste batteries, hereinafter). First of all, constituent materials obtained by disassembling (FIG. 2(a)) waste batteries are classified (FIG. 2(b)) on a material basis, and only electrode active materials containing valuable metals at high density are separately collected. The thus separately collected electrode active materials are treated with an acid solution (Acid Leaching; FIG. 2(c)) to prepare an acid solution containing dissolved valuable metals, and by supplying this acid solution to a dialysis device (FIG. 1), the acid solution is separated to a concentrated liquid (A Liquid), in which Li and acids are relatively concentrated, and another concentrated liquid (B Liquid) in which transition metal ions (Co) are relatively concentrated (FIG. 2(d)). Acids are further recovered from A Liquid containing Li and acids (FIG. 2 e)), and subsequently, by mixing carbonate with a resulting residue liquid, Li can be recovered as a lithium carbonate Li2CO3 (FIG. 2(f)). The acids recovered in the acid recovery step of FIG. 2(e) can be reused to the acid leaching step (FIG. 2(c)). By subjecting B Liquid containing relatively concentrated Co to only a simple operation of pH adjustment, Co is deposited/precipitated as a hydroxide, and then the precipitate is filtered and recovered (FIG. 2(g)). Through a series of these treatments, valuable metals and an excessive amount of acids can be separately recovered from waste batteries. Note that if acids can be sufficiently recovered in the step of recovering acids from A Liquid in FIG. 2(e), it is possible to recover Li even when a carbon dioxide gas is mixed with the residue liquid in FIG. 2(f).

Hereinafter, the valuable metal recovery flow will be described in detail in accordance with the steps shown in FIG. 2.

In order to recover valuable metals from waste lithium batteries (hereinafter, referred to as waste batteries), there is a need to disassemble the batteries in the first place, but ahead of the disassembling, an electric charge that may remain in the batteries is discharged. In the present invention, an electric charge remaining in batteries is discharged by dipping the batteries in a conductive liquid containing an electrolyte.

In this embodiment, a sulfuric acid/γ-butyrolactone mixture liquid was used as the conductive liquid containing an electrolyte. Since the sulfuric acid acts as an electrolyte in the mixture solution, the conductivity (inverse number of resistance value) can be adjusted by adjusting the concentration of the sulfuric acid. In this embodiment, the electrical resistance of the solution at the right end to the left end of a discharge bath was actually measured and found to be 100 kΩ. When the resistance value of the solution is excessively low, it is dangerous because discharge rapidly proceeds, and in contrast, when the resistance value is excessively high, the practicality lowers because it takes too much time for discharging. In the present invention, it is desirable that the resistance of the solution be in the range of about 1 kΩ to about 1,000 kΩ, and it is advisable to adjust the concentration of the electrolyte so that the resistance of the solution falls within this resistance range.

Preferred examples of electrolytes in the present invention include, besides sulfuric acid, acids such as hydrochloric acid, nitric acid, and formic acid; salts such as ammonium nitrate, ammonium sulfate, calcium nitrate, and magnesium sulfate; and bases such as potassium hydrate, cesium hydroxide, lithium hydroxide, and tetramethyl ammonium hydroxide. Further, usable examples of a solvent in which these electrolytes are dissolved to prepare a conductive liquid include, besides γ-butyrolactone, sulfolane, propylene carbonate, ethylene carbonate, NMP (N-methyl pyrrolidinone), dimethoxy ethane, tetramethyl urea, dimethyl imidazolidinone, dimethyl sulfone, water, acetonitrile, and mixtures thereof.

Examples of waste batteries referred to in the present invention include, besides so-called spent batteries which have reached a limit of the specified number of charge/discharge cycles and hold a less electric charge capacity, semi-finished products which are brought about due to defects or the like in battery manufacturing steps, and old model battery stockpiles generated by a change in product specification.

Waste batteries that have undergone a discharge treatment in FIG. 2(a) are disassembled. Component members of the waste batteries having undergone the discharge treatment, such as a housing, packing/safety valves, circuit elements, spacers, current collectors, separators and positive and negative electrode active materials, are respectively disassembled and separately collected on a component member basis (FIG. 2(a)).

Note that, needless to say, since waste lithium ion batteries are often filled with gases inside thereof and the inside thereof is in a pressurized condition, it is necessary to pay attention to safety in the disassembling step. In this example, the waste batteries were wet-ground while cooling in a condition where they are dipped in a conductive liquid containing the electrolyte. By employing the wet-grinding under cooling, it was possible to grind the batteries with safety and without spreading gases filling inside thereof into the air.

In addition, to promote peeling of positive electrode active materials and negative electrode active materials applied to/molded on surfaces of current collectors away from the respective surfaces of the current collectors, it is allowed to modify the composition of the conductive liquid containing the electrolyte dissolving an electrolyte. Note that when the conductive liquid is used in the discharging step, the conductivity is an important property to care, and when the conductive liquid is used in the wet-grinding step, the viscosity and dielectric constant are important properties to care.

Since there is a difference in requirements specification between the discharging step and the wet-grinding step, the composition of the conductive liquid may be changed on a step basis; however, it that case, there is a need to prepare two or more types of conductive liquids. In this example, the compositions of the conductive liquids used in these steps were made identical to each other from the viewpoint of simplification of procedures, saving time and effort and cutting costs.

Examples of wet-grinding methods that can be used in the present invention include ball mill methods, but are not necessarily limited thereto. After grinding the waste batteries under a condition that among component members such as a housing, packing/safety valves, circuit elements, spacers, current collectors, separators and electrode active materials, active materials for positive electrode (referred to as positive electrode active materials, hereinbelow) and active materials for negative electrode (negative electrode active materials) are preferentially ground, the component members are subjected to a sieving treatment. With this treatment, the positive electrode active materials and negative electrode active materials are sifted under a sieve and recovered, and members other than these electrode active materials are sifted on the sieve and recovered (FIG. 2(b)).

Although sieving is used in this example, these materials have been preliminarily wet-ground, and thus a slurry obtained by wet-grinding may be directly separated by a filtration treatment, using a filter having a relatively coarse mesh size. By introducing consecutive treatments of from wet-grinding to filtration, there is a possibility of improving the recovery percentage. Note that housing, packing/safety valves, current collectors (aluminum foil, copper foil) etc. are greater in ductileness than positive electrode active materials (typically, LiCoO2) and negative electrode active materials (typically, graphite), and therefore, these members have higher breaking strengths. Due to the properties, broken substances obtained from electrode active materials eventually have sizes smaller than broken substances obtained from members other than the electrode active materials, and as a result of this, these constituents can be easily separately collected by sifting or filtration.

The sieved substances obtained through the above treatment are then dissolved using a mineral acid containing halide ions (ACID LEACHING; FIG. 2(c)). In this example, a treatment liquid prepared by adding any of γ-butyrolactone, sulfolane or NMP to hydrochloric acid (12N; 36%) was slowly dropped, and a Li compound, which is a positive electrode active material, was speedily dissolved, but carbon constituents, which are negative electrode active materials, were found to be insoluble. It is observed that the above-mentioned solvents (γ-butyrolactone, sulfolane, and NMP) added to the treatment liquid have an effect of promoting dissolution of resin binders contained in batteries.

Positive electrode active materials contained in the waste lithium ion batteries used in this example is a lithium compound primarily containing LiCoO2, but may contain positive electrode active materials having other compositions. Note that when the treatment liquid containing hydrochloric acid was mixed with the lithium compound all at once, instead of being slowly dropped, the lithium compound tends to vigorously react with the treatment liquid and be dissolved therein and to generate by-product chlorine gas; however, when a treatment liquid obtained by further mixing methyl alcohol, dimethyl sulfone or the like with a solvent such as γ-butyrolactone beforehand and then adding the resulting solvent to hydrochloric acid was used, or when Cu2O, CuCl, SnCl2, silica gel or the like was added in advance to the sieved substances and then the sieved substances were subjected to the acid leaching treatment, by-product chlorine gas was less likely to occur or the discharge of by-product chlorine gas was likely to decrease.

Note that in this example, a hydrochloric acid (12 N; 36%) was used; however, if the dilution factor of the hydrochloric acid falls within the range of concentration thicker than 2-fold dilution (6 N), it can be used with no problem. If the dilution factor of the hydrochloric acid is 6 N or lower, for example, in the case of 3 N to 6 N, the hydrochloric acid highly prevents by-product chlorine gas from generating, the speed of dissolving the lithium compound is likely to become slow. In addition, since the phenomenon that lithium ions permeate an anion selectively permeable membrane is less likely to occur in regions having low halide ion concentration, it is desirable to use the hydrochloric acid within the range of concentration thicker than 2-fold dilution (6N).

Examples of the mineral acid containing halide ions usable in the present invention include, besides hydrochloric acid (12N; 36%), hydrochloric acid, sulfuric acid, phosphoric acid, nitric acids or a mixture of these acids thereof and salts containing halide ions such as lithium chloride, magnesium chloride, calcium chloride, copper bromide or the like. Mineral acids containing alkali metals other than lithium, which have difficulties to separate from lithium, (sodium, potassium, rubidium, and cesium) are not used in the present invention. In consideration of types and composition, treatment amount, treatment time and costs of the lithium compound, the mineral acid can be suitably selected from those described above. Negative electrode active materials (carbon materials) remained insoluble after completion of the acid leaching treatment can be removed by filtering the leaching liquid. The obtained filtrate is conveyed to a pressure dialysis bath with an anion exchange membrane and subjected to dialysis separation (FIG. 2(d)) based on pressure dialysis principles.

A schematic structure of a dialysis bath 8 for use in a valuable metal recovery device according to the present invention is shown in FIG. 1.

The dialysis bath 8 shown in FIG. 1 is equipped with a pressure dialysis tank 6 which comprises an acid leaching liquid inflow port 2 for supplying an acid leaching liquid having undergone filtration, and an acid leaching liquid outflow port 3 from which the acid leaching liquid, having undergone dialysis, flows out; and a recovery liquid tank 7 which comprises a recovery liquid inflow port 4 for supplying a recovery liquid for recovering acids and lithium through the dialysis, and a recovery liquid outflow port 5 from which a recovery liquid, in which acids and lithium permeated through a dialysis membrane 1 have been dissolved, flows out. In addition, the pressure dialysis tank 6 and the recovery liquid tank 7 are structured to be connected through the dialysis membrane 1.

In this example, as the dialysis membrane 1, SELEMION DSV, an anion exchange membrane for diffusion dialysis, manufactured by Asahi Glass Co., Ltd., was used after being processed and fitted into between the pressure dialysis tank 6 and the recovery liquid tank 7.

In the present invention, other anion exchange membranes can also be used; however, in that case, it is desirable to select one in view of the ionic transport number and the oxidation resistance.

Since FIG. 1 shown herein is a schematic diagram, the details are omitted; however, each inflow port and each outflow port are individually provided with a flowmeter and a manometer, and the dialysis tank 6 and the recovery liquid tank 7 are individually provided with a liquid scale. There is no need to point out, but instruments and equipment necessary for realizing the function of the dialysis bath 8, such as a rectification mechanism for rectifying the flow of a liquid, a pressurization mechanism for pressing and a controlling mechanism for controlling overall functions, besides sensors such as a conductivity meter, pH meter, and ion concentration meter are provided in just proportions. Further, for the purpose of making full use of the dialysis function, flow passages are arranged so that the flow of the acid leaching liquid is almost counter-current to the flow of the recovery liquid at the both surfaces of the dialysis membrane.

The dialysis bath is designed so that a filtrate after being subjected to acid leaching, which can be obtained through a series of steps (FIG. 2(a) to (c)) described above, is supplied from the acid leaching liquid inflow port 2 of the dialysis bath 8, flows toward the acid leaching liquid outflow port 3 and passes on the surface of the dialysis membrane 1 during the time when the filtrate reaches the acid leaching liquid outflow port 3 from the acid leaching liquid inflow port 2. A mechanism is provided so that at the time when the acid leaching liquid passes the surface of the dialysis membrane 1, lithium ions, acids and the like dissolved in the acid leaching liquid adsorb to the surface of the dialysis membrane 1 and diffuse inside the dialysis membrane 1, thereby the acid leaching liquid is ion-exchanged with the recovery liquid.

In this example, an acid leaching liquid obtained after disassembling a spent lithium ion battery for digital camera was supplied to such a dialysis bath 8. As a result of this, the concentration proportions of lithium to cobalt, Li/Co, dissolved in the acid leaching liquid before being subjected to dialysis was about 0.1; however, the concentration proportions of lithium to cobalt, Li/Co, dissolved in the recovery liquid recovered by one-step dialysis was about 0.7, and it turned out that lithium was recovered in a concentrated state. Therefore, it means that the transport number of lithium ions in the dialysis membrane (SELEMION DSV manufactured by Asahi Glass Co., Ltd.) used in this example is about 7 times the transport number of cobalt ions in the dialysis membrane. However, since SELEMION is an anion exchange membrane, lithium permeates through the membrane in a state of not being a monovalent cation, and cobalt permeates through the membrane in a state of not being a divalent or trivalent cation. As of now, the point that lithium ions and cobalt ions permeate through the membrane in what ionic forms inside the membrane is not yet confirmed.

Note that acids dissolved in the acid leaching liquid are also recovered together with Li; furthermore, the recovery of acids through dialysis is a phenomenon usually observed in a dialysis treatment using an anion exchange membrane. Whatever the case may be, since the transport number of lithium ions is about 7 times the transport number of cobalt ions in the present invention, it is desirable to circulate the acid leaching liquid in a multistage mode where at least 3 or more steps are coupled. By utilizing such a multistage circulation, it is possible to obtain a concentrated recovery liquid (a concentrated liquid of Li and acids) in which the Li/Co concentration proportion is at least 100 or more times (by a simple estimation, more than 300 times). Note that it is unnecessary to excessively increase the number of steps because the Li/Co concentration proportion can be increased by removing Co through the after-mentioned acid retardation technique.

Note that in this example, dialysis was performed under pressure, but diffusion dialysis and electrodialysis may also be used in combination. However, in the case of adopting diffusion dialysis alone, it takes long hours to complete a dialysis treatment, and therefore, diffusion dialysis is not suitable for processing of a large amount of waste batteries. Since the diffusion dialysis has advantages in that it requires no pressure mechanism and thus energy needed for application of pressure can be saved, if it is intended to realize small-scale recycling at low cost, the recycling can be done through use of diffusion dialysis alone. Meanwhile, if the electrodialysis method described in Patent Literature 1 and the like is used, it is possible to obtain a concentrated recovery liquid thorough a one-step dialysis treatment; however, since condensation requires electric energy, processing of an enormous amount of acid leaching liquid through electrodialysis alone is not realistic, and it seems desirable to use pressure dialysis in combination.

To a recovery liquid obtained through dialysis as described above, besides Li and Co, acids added in an excessive amount at the time of acid leaching are also recovered. With this being the situation, in the present invention, a step of recovering such an excessive amount of acids to recycle the acids to the acid leaching step is provided. Specifically, excess acids are recovered using a technique called Acid Retardation (FIG. 2(e)). Note that at the time of carrying out acid retardation, if utilizing the phenomenon that Co is leached out earlier than Li, a small amount of Co contained in the recovery liquid can be removed.

From the recovery liquid from which impurities and an excessive amount of acids are removed in this way, high-purity Li can be recovered (FIG. 2(f)). Specific examples of the method of recovering high-purity Li include a method in which the pH of the recovery liquid is adjusted to recover Li as a precipitate of lithium hydroxide; a method in which sodium carbonate is added to the recovery liquid to recover Li as a precipitate of lithium carbonate, and a method of blowing a CO2 gas into the recovery liquid while subjecting to electrodialysis. Meanwhile, from the acid leaching liquid recovered from the acid leaching liquid outflow port 3 after dialysis treatment, Li has been removed. The acid leaching liquid having been subjected to the dialysis treatment in this example was analyzed, and only Co was detected as a main valuable metal constituent. It can be concluded from this point of view that the acid leaching liquid is a Co selectively concentrated liquid. The positive electrode active material in the waste lithium ion battery processed in this example is presumed to be LiCoO2. To recover Co from this acid leaching liquid, having undergone a dialysis treatment, a precipitation recovery method can be used, in which Co is recovered as a precipitate of hydroxide through pH adjustment of the acid leaching liquid (FIG. 2(g)). In the case where the positive electrode active material contains lithium compounds other than LiCoO2, for instance, in the case where the positive electrode active material contains LiNiO2, LiMnO2 or the like, Co, Ni and Mn can also be recovered as hydroxides through pH adjustment of the acid leaching liquid.

EXAMPLE 2

Figure 3:
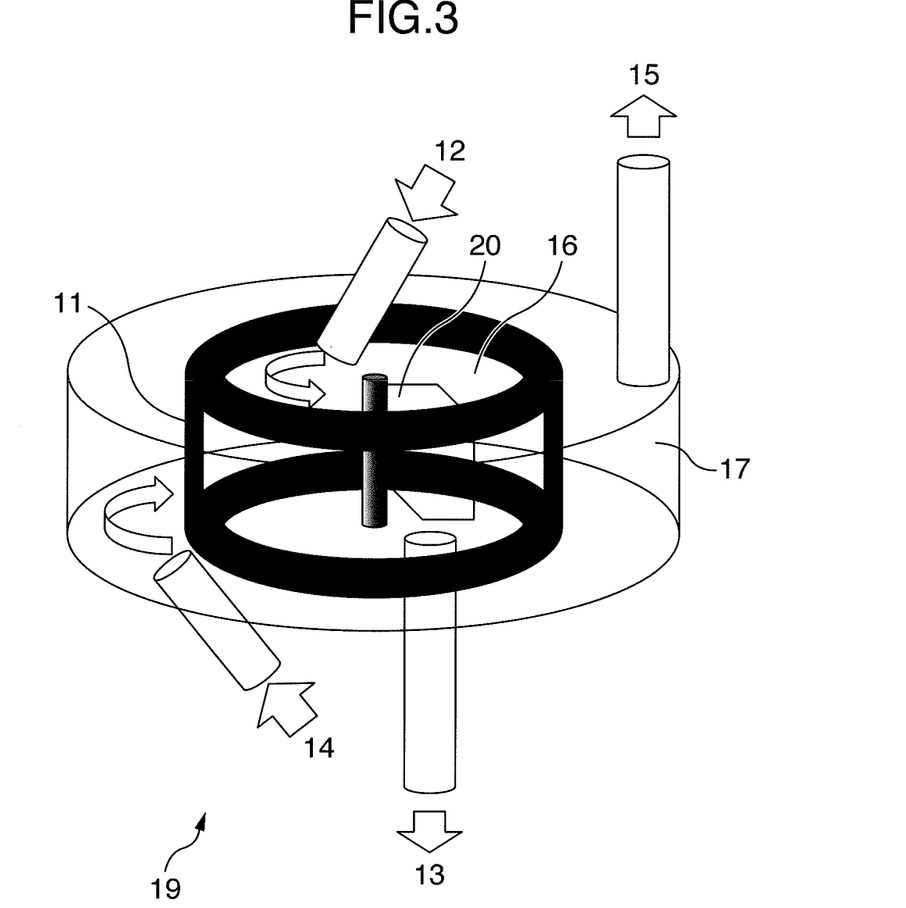
FIG. 3 is a block diagram of another example of a valuable metal recovery device according to the present invention.

Next, Example 2 is described using FIGS. 2 and 3. Also in Example 2, a valuable metal recovery flow is carried out according to the process flow shown in FIG. 2.

A waste battery is disassembled in the step (a) of FIG. 2. In Example 2, an electric charge that may remain in the battery is discharged using the same method (conductive liquid dipping discharge) as described in Example 1. In this example, as a low-viscosity liquid substituted for the sulfuric acid/γ-butylolactam used in Example 1, an acetone-water mixture liquid containing 0.1% sulfuric acid was used as a conductive liquid for discharge (discharge medium). Since acetone is a typical low-viscosity liquid, which has a viscosity of about ⅓ that of water at ambient temperature, it can reduce energy loss required for stirring of a conductive liquid. In addition, since in a low-viscosity liquid, the transportation speed of a charged material (electrolyte molecules) is generally high, the conductivity of the solution can be relatively easily kept high even though a low-concentration electrolyte is used therein. As a result of this, it is possible to reduce the use amount of electrolytes required for obtaining a desired conductivity.

Examples of materials that can be used for the conductive liquid, other than those described above, include ethanol, methylethylketone, methanol, and 2-propanol. It is desirable for the conductive liquid to have a viscosity lower than about 1 mPa·s (a viscosity of pure water at ambient temperature) as a guideline, and when necessary, the viscosity of the conductive liquid may be adjusted by warming a little. For example, by increasing the temperature of 2-propanol to about 50° C. and the temperature of anisole to about 40° C. or higher, it is possible to obtain a desired viscosity of the conductive liquid. However, when a conductive liquid having a flash point is warmed, it is necessary to note that an appropriate explosion-proof device is needed. Examples of the method of adjusting the viscosity, other than the warming method, include addition of a surfactant. By adding a small amount of an ionic surfactant, it is possible to realize adjustment of the conductivity of the conductive liquid concurrently with adjustment of the viscosity thereof.

Note that when discharge of an electric charge remained inside of a waste battery starts, the temperature of the conductive liquid is increased by Joule heat, and thus there is a need to cool the liquid as required. When a conductive liquid having volatility such as a water-acetone mixture liquid is used, mixed steam (it is not necessarily an azeotrope; e.g. in the case of using water and acetone) is generated. Therefore, by recovering/condensing of the mixed steam, it is possible to recover power remaining inside the waste battery as latent heat of vaporization.

Upon completion of spontaneous discharge of the waste battery, the generation of Joule heat stops and the temperature of the conductive liquid starts to decrease, and then the waste battery is salvaged, followed by proceeding with the subsequent steps, i.e. disassembling of waste battery/grinding step and separation of members through sifting step (FIG. 2(b)). In Example 2, disassembling of waste battery/grinding step and the sifting step were carried out in the same methods as given in Example 1.

Next is the step of acid leaching of positive electrode active material shown in the step (c) of FIG. 2. In Example 2, a mixture of several types of waste lithium ion batteries was subjected to an acid leaching treatment using acids containing no halide ion. Since a resin binder is bound to positive electrode active materials of the lithium ion batteries and there is a need to subject the positive electrode active materials to acid dissolution while peeling off the resin binder, the positive electrode active materials are dissolved using acids while mechanically stirring. Appropriate stirring of the acid leaching liquid causes cracks and pinholes on the resin binder coating surfaces of the positive electrode active materials. As a result of this, the acid leaching liquid comes in contact with the positive electrode active materials, and thereby the acid dissolution proceeds. By selecting an appropriate stirring step and an appropriate stirring method in consideration of the treatment amount of waste batteries, the binder material in the batteries and the amount thereof, the types of positive electrode active materials (cobalt acid lithium, lithium nickel acid, lithium manganese acid, lithium iron phosphate, etc.) and the amount thereof, the acid dissolution of the positive electrode active materials proceeds at an adequate speed, without causing a sharp acid dissolution reaction. In Example 2, it was possible to confirm that acids containing no halide ion can also be used for acid dissolution and dialysis separation. Further, not only mineral acids but also organic acids can be used. Examples of usable acids containing no halide ion include sulfuric acid, fuming sulfuric acid, phosphoric acid, nitric acid, fuming nitric acid, sulfamic acid, benzene sulfonic acid, mixtures thereof, molybdic acid compounds, thiocyanic acid compounds, and tungstic acid compounds. However, from the viewpoint of inexpensiveness, relatively low viscosity and relatively high safety, sulfuric acid and nitric acid are preferred. The concentration of each of these acids is desirably at least about 10 vol % or more, and more desirably about 30 vol % or more. In addition, since sulfuric acid ions and nitric acid ions are relatively small in ion size, these ions can be said to be acids containing no halide ion, easily usable for the present invention, also in consideration of the permeability speed in the after-mentioned dialysis step.

There is no need to point out, but in order to proceed the acid dissolution at an adequate speed while peeling off the binder bound to positive electrode active materials, it is desirable to analyze the composition of the sifted substance to be dissolved (a mixture of positive electrode active materials and other materials) in advance of the dissolution step. In Example 2, since acid leaching was carried out using an acid containing no halide ion, depending on the combinations of the types and the use amount of binders and positive electrode active materials contained in waste batteries, there may be cases where the acid leaching speed of the positive electrode active material slows down and the positive electrode active materials are not completely dissolved. Even in such a case; however, no particular problem occurs, because it is easy to remove a mixture of positive electrode active materials and negative electrode active materials which remained insoluble, if the supernatant fluid is separated by a filtration/separation treatment before the mixture being subjected to pressure dialysis, which is the subsequent step. Further, in Example 2, if a centrifugal filtration system is employed, the consistency of the device and processes with the subsequent dialysis step is high.

In Example 2, in the dialysis separation of FIG. 2(d), lithium, which is a valuable metal, is recovered using a centrifugal dialysis device 19, the schematic structure thereof shown in FIG. 3. The centrifugal dialysis device 19 is equipped with a dialysis tank (inner bath) 16 which comprises an acid leaching liquid inflow port 12 for supplying an acid leaching liquid obtained through the steps described above in Example 2, and an acid leaching liquid outflow port 13 from which the acid leaching liquid, which have been undergone dialysis and the concentration of lithium lowered, flows out; and a recovery liquid tank (outer bath) 17 which comprises a recovery liquid inflow port 14 for supplying a recovery liquid (e.g. pure water) for recovering acids and lithium through dialysis, and a recovery liquid outflow port 15 from which a recovery liquid, in which acids and lithium permeated through a dialysis membrane 11 have been dissolved, flows out. The dialysis tank 16 and the recovery liquid tank 17 are independently rotatable, with a rotating shaft being shared therebetween.

The dialysis membrane (anion selectively permeable membrane) 11 is mounted to a cylinder-side portion of a cylindrical-shaped dialysis tank 16 which is provided inside the recovery liquid tank 17, the internal surface of the dialysis membrane 11 is in contact with a dialysis subject liquid (acid leaching liquid) which is forming a rotating laminar flow in the dialysis tank 16, and the external surface of the dialysis membrane 11 is in contact with a recovery liquid which is forming a rotating laminar flow in the recovery liquid tank 17. Further, the dialysis tank 16 and the recovery liquid tank 17 rotate in the reverse direction each other so that the flowing direction of the dialysis subject liquid (acid leaching liquid) which comes into contact with the dialysis membrane 11 from the inner side and the flowing direction of the recovery liquid which comes into contact with the dialysis membrane 11 from the outer side are in reverse-rotation each other in a circumferential direction.

Further, in the structure of the centrifugal dialysis device 19 of FIG. 3, which was employed in Example 2, a force acts against the dialysis membrane 11 in a perpendicular direction penetrating the membrane surface due to a centrifugal force derived from rotation of the acid leaching liquid itself inside the dialysis tank 16, and as a result of this, ion dialysis that directly influences the recovery efficiency of lithium is promoted. Specifically, a centrifugal force in proportion to the square of the flow rate of the rotating laminar flow of the acid leaching liquid inside of the dialysis tank 16 acts, and a permeation speed is increased by the corresponding hydraulic potential of the centrifugal force. By using a device capable of adding such a centrifugal action, dialysis recovery of lithium ions can be realized in a shorter time span. Furthermore, at the external surface of the dialysis membrane 11, a centrifugal force derived from the rotating laminar flow of the recovery liquid, heading toward the peripheral direction of the recovery tank 7, acts. As a result of this, at a surface of the dialysis membrane 11, facing the recovery liquid tank 17 (i.e. the outer surface of the membrane), a force acts on ionic species (lithium ions, and anions of dissolved acids) exuding to the membrane surface so as to peel the ionic species off toward the periphery of the tank, and thereby dialysis is promoted.

To realize a smooth and homogenous laminar flow, it is preferable, from mechanical aspects, that both the dialysis tank 16 and the recovery liquid tank 17 have a cylindrical shape and share a rotating shaft. Note that even if the recovery liquid tank 17 is anchored so as not to rotate, the effect of centrifugal dialysis can be obtained, as long as the dialysis tank 16 is designed to be rotatable; however, the effect will be greater by making the recovery liquid tank 17 rotatable.

Note that in FIG. 3, the dialysis device is illustrated in a mode where the acid leaching liquid is made to flow in from the upper portion of the dialysis tank 16 and flow out from the lower portion of the dialysis tank 16, the recovery liquid is made to flow in from the lower portion of the recovery liquid tank 17 and to flow out from the upper portion of the recovery liquid tank 7, the arrangement may be turned upside down; however, it is desirable that the rotation axis direction (vertical direction) of the acid solution be opposed to the rotating shaft direction of the recovery liquid. This is because with respect to rotation axis directions at the surface of the dialysis membrane, the acid solution flows in a direction opposite to the direction in which the recovery liquid flows (countercurrent flows), resulting in an improvement in dialysis speed. In other words, the acid leaching liquid may flow in from the lower portion of the dialysis tank 16 and flow out from the upper portion of the dialysis tank 16, and the recovery liquid may flow in from the upper portion of the recovery liquid tank 17 and flow out from the lower portion of the recovery liquid tank 17.

Further, in a plane direction perpendicular to the rotation axis direction, the acid leaching liquid inflow port 12 and the acid leaching liquid outflow port 13 are provided almost opposite to the rotating shaft; however, as shown in FIG. 1, the acid leaching liquid inflow port 12 and the acid leaching liquid outflow port 13 may be provided at the same side of the tank.

Further, it is desirable that the inflow ports coupled to their respective tanks (acid leaching liquid inflow port 12 and recovery liquid inflow port 14) be coupled slightly inclined with respect to the rotation axis of their respective tanks so that respective inflowing liquids flow outward. This is because, by making the inflow ports inclinedly connected to their respective tanks, inflowing liquids each spontaneously form a laminar flow rotating along the outside wall of their respective tanks by inflow pressure.

Whatever the case may be, the dialysis device is designed so that a liquid flowing into a tank forms a laminar flow rotating along the outside wall of the tank.

Further, for the purpose of maintaining a steady rotating laminar flow and adjusting the flow rate and the direction of flow, a stirring blade 20, a flow guide plate (not shown) and the like may be mounted inside the dialysis tank 16. Also inside the recovery liquid tank 17, a stirring blade (not shown) may be used concurrently. By making relatively reversely directed steady rotating laminar flows, it is possible to form a relatively counter-current flow at the inner surface and the external surface of the dialysis membrane 11 and gain a difference in relative flow rates, and thus the dialysis efficiency can be improved.

That is, by designing the dialysis device to realize steady counter-current rotating laminar flows after providing the dialysis tank 16 inside the recovery liquid tank 17, high-speed flows which are always horizontal to the membrane surface occur at the inner surface and the external surface of the dialysis membrane 11, and degradation in permeability attributable to adhesion of foreign matters on the surface of the membrane is controlled, and so it stands up to long-term use.

The dialysis of the present invention is a phenomenon based on a so-called dissolution-diffusion mechanism, wherein the diffusion of ions inside of the dialysis membrane 11 is rate-determining step, and as for the lithium ion-selective permeability, for example, in the recovery of lithium from cobalt acid lithium, the selectively permeability proportions of lithium ion/cobalt ion is resulting from a difference in diffusion behavior of respective ions in the dialysis membrane. The dialysis-promoting action brought by centrifugal forces adopted in Example 2 does not significantly influence upon the internal molecule structure (orientation of polymer chain, etc.) of a dialysis membrane, which is a gelatinous solid. In Example 2, the same dialysis membrane (ion exchange membrane, SELEMION DSV manufactured by Asahi Glass Co., Ltd.) as used in Example 1 was used to examine and determine the proportion of concentration of lithium/cobalt recovered into the recovery liquid tank, and as far as the membrane examined, the proportion of the concentration of lithium to cobalt was found to be about the same (about 0.7) as in Example 1. In Example 1, it is assumed that some kind of interactions act between lithium ions and halide ions (relative hydrophobic ion species having small stokes radii) captured in the dialysis membrane 1, and the interactions influence upon lithium ion selective permeability; however, in Example 2, since halide ions are not virtually contained in the dialysis membrane 11, there is a possibility that the dialysis selectivity ratio of lithium ions can be further improved by further extending the scope of examinations in the future. Specific examples of those to be examined are the molecular structure of a material used in the dialysis membrane 1, the film thickness of the dialysis membrane 1, and the flow rates of rotating laminar flows.

Note that since FIG. 3 shown herein is a schematic diagram of the centrifugal dialysis device 19, the details are omitted; however, each inflow port and each outflow port are individually provided with a flowmeter and a manometer, and the dialysis tank 16 and the recovery liquid tank 17 are individually provided with a liquid scale. There is no need to point out, but instruments and equipment necessary for realizing the function of the centrifugal dialysis bath 19, such as a flow controller to guide the flow of the liquid, a pressurization mechanism for pressing and sending the treatment liquid, and a controlling mechanism for controlling overall functions, besides sensors such as a conductivity meter, pH meter, and ion concentration meter are provided in just proportions.

In Example 2, if the recovery liquid flowed out and recovered from the recovery tank 17 is subjected to the lithium recovery treatment (FIG. 2(f)), as in the case of Example 1 described above, high-purity lithium can be recovered, and acids can also be recovered (FIG. 2(e)).

Meanwhile, as the concentration of lithium of the acid leaching liquid recovered from the acid leaching liquid outflow port 13 and having undergone dialysis treatment, lithium was not completely removed therefrom; however, the lithium content thereof surely decreased as compared to the composition of the liquid obtained immediately after acid leaching. The acid leaching liquid having been subjected to dialysis treatment in Example 2 was analyzed, and as main valuable metal constituents, besides low-concentration lithium, cobalt, manganese and nickel were detected. The positive electrode active material in the waste lithium ion battery processed in Example 2 is presumed to be a composite oxide containing lithium and transition metals, such as lithium cobaltate, lithium manganate, and lithium nickelate. For separating and recovering cobalt, nickel and manganese from the acid leaching liquid having undergone a dialysis treatment, a method of recovering precipitates of hydroxides through pH adjustment, solvent extraction and the like can be used (FIG. 2(g)).

Note that Example 2 is different from Example 1 in terms of the battery dissolution step (FIG. 2(a)), acid leaching step (FIG. 2(c)), and dialysis separation step (FIG. 2(d)); however, with respect to these steps, the steps in Example 1 and the steps in Example 2 can be suitably selected and used in combination. That is, it is possible to subject an acid solution, in which positive electrode active materials have been dissolved using a hydrochloric acid, to the dialysis step using the centrifugal dialysis device 19 of Example 2, and it is also possible to subject an acid solution prepared using a sulfuric acid and a nitric acid to the dialysis step using the dialysis device (dialysis bath) 8 of Example 1.

EXAMPLE 3

Example 3 will be described using FIG. 4. In Example 3, the steps other than dialysis separation step (FIG. 2(d)) are the same as in Example 2, and thus the details are omitted.

In Example 3, a treatment of a waste battery containing a lithium compound having a spinel crystal structure, except lithium cobaltate, was carried out. For the steps from discharge, disassembling/separation, grinding, sifting to acid leaching, the same methods as in Example 2 were used to perform the treatment.

Figure 4:
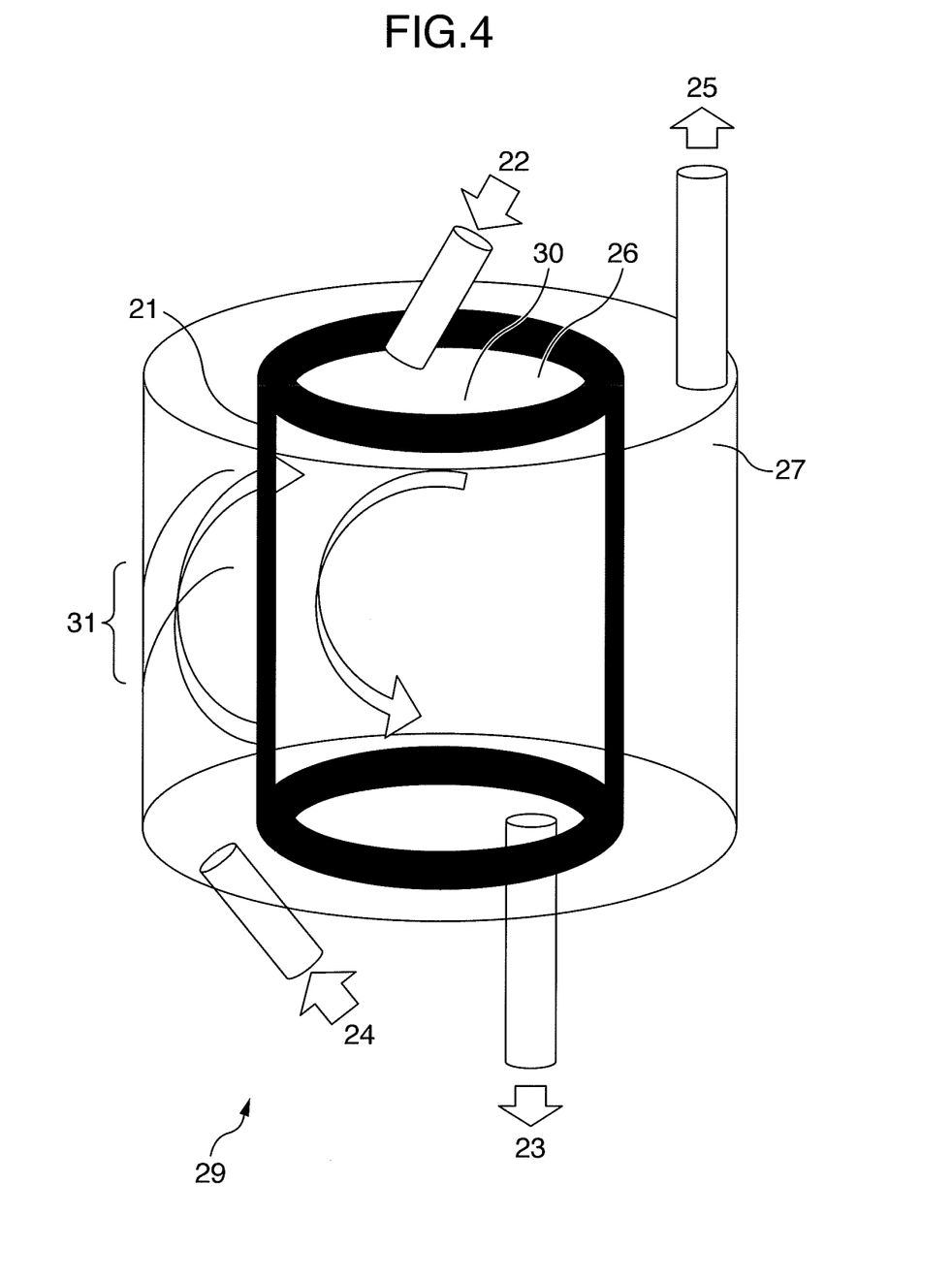
FIG. 4 is a block diagram of more one other example of a valuable metal recovery device according to the present invention.

In Example 3, a centrifugal dialysis device 29 having a long axis-cylinder double tube structure, which is shown in FIG. 4, was used instead of using the centrifugal dialysis bath 19 used in Example 2. In the flat dialysis bath used in Example 2, the liquid flow in the bath becomes a horizontally rotating laminar flow; however, when a long axis cylindrical-shaped dialysis bath as with Example 3 is used, the liquid flow becomes a spiral-shaped rotating laminar flow (spiral flow). To steadily maintain a spiral-shaped rotating laminar flow across the tube length in the long axis cylinder, a flow control mechanism is provided to a cylinder wall. In the structural example shown in FIG. 3, spiral grooves engraved on the cylinder wall correspond to the rectification mechanism.

The dialysis bath having a long axis-cylinder double tube structure used in Example 3 has a larger cross-section area in a dialysis membrane 1 than the flat cylindrical-shaped dialysis bath used in Example 2, and thus the amount of lithium ions recoverable per unit time increases. In this connection, the dialysis recovery speed obtained in the case of using a centrifugal dialysis recovery bath is influenced by the dialysis cross-section of the dialysis membrane 21, the flow rate of a dialysis subject liquid at a surface of the dialysis membrane 21 and the flow rate of a recovery liquid at a surface of the dialysis membrane 21 (relative speed between a dialysis subject liquid and a recovery liquid), the pressure acting in a direction penetrating through the membrane surface of the dialysis membrane 21 and the like.

Note that in Example 3, a dialysis bath having a long axis-cylinder double tube structure was used, but if lots of the flat cylindrical-shaped dialysis bathes as illustrated in Example 2 are coupled one above the other, almost equal effect can also be obtained. In that case, it is important to design the layout in a plant so as not to cause problems, such as the footprint increases, or the pipeline is complicated, resulting in a sacrifice of maintainability.

In Example 3, it was possible to obtain high-purity lithium by subjecting a recovery liquid flown out and recovered from a recovery liquid tank 27 to treatments similar to those of Example 2, and it was possible to separate and recover cobalt, nickel and manganese by also subjecting an acid leaching liquid flown out and recovered from an acid leaching liquid outflow port 23 to treatments similar to those of Example 2.

REFERENCE SIGNS LIST 1, 11, 21: dialysis membrane; 2, 12, 22: acid leaching liquid inflow port; 3, 13, 23: acid leaching liquid outflow port; 4, 14, 24: recovery liquid inflow port; 5, 15, 25: recovery liquid outflow port; 6, 16, 26: pressure dialysis tank; 7, 17, 27: recovery liquid tank; 8: dialysis bath; 9: dialysis device; 19, 29: centrifugal dialysis device

The invention claimed is:

1. A metal recovery method for recovering metals from a positive electrode material for lithium ion batteries containing lithium and a transition metal element, the method comprising:
   an acid leaching step of dissolving the positive electrode material in an acid solution to generate lithium ions and transition metal ions in the acid solution;
   a dialysis step of flowing the acid solution containing the lithium ions and the transition metal ions and a recovery liquid, with an anion permeable membrane interposed between the acid solution and the recovery liquid, thereby permeating the lithium ions from the acid solution to the recovery liquid; and
   a lithium recovery step of recovering the lithium ions from the recovery liquid containing the permeated lithium ions;
   wherein the dialysis step is performed by a process selected from the group consisting of pressure dialysis and centrifugal dialysis.

2. The metal recovery method according to claim 1, wherein the acid solution is a mineral acid containing halide ions.

3. The metal recovery method according to claim 2, wherein the mineral acid containing halide ions is hydrochloric acid.

4. The metal recovery method according to claim 1, wherein the acid solution is sulfuric acid or nitric acid.

5. The metal recovery method according to claim 1, wherein the transition metal element is cobalt.

6. The metal recovery method according to claim 1, wherein, in the dialysis step, the acid solution and the recovery liquid are flowed countercurrently to each other in a bath, with the anion permeable membrane interposed therebetween.

7. The metal recovery method according to claim 1, wherein the transition metal ions are recovered from the acid solution that has undergone the dialysis step.

8. The metal recovery method according to claim 1, wherein, in the dialysis step, the recovery liquid containing the permeated lithium ions and another recovery liquid are flowed, with an anion permeable membrane interposed therebetween, thereby permeating the lithium ions from the recovery solution to the another recovery liquid to perform dialysis a plurality of times.

9. The metal recovery method according to claim 1, wherein, in the dialysis step, acids in the acid solution are also permeated to the recovery liquid;
   in the lithium recovery step, the acids in the recovery liquid are recovered; and
   the recovered acids are used in the acid leaching step.

10. The metal recovery method according to claim 1, wherein the dialysis step is performed by centrifugation, and the acid solution is flowed into an inner bath having the anion permeable membrane on an outer periphery of rotator; the recovery liquid is flowed between the inner bath and an outer bath located outside the inner bath; and the dialysis is performed while rotating the inner bath.

11. The metal recovery method according to claim 10, wherein, in the dialysis step, the outer bath is rotated in a direction opposite to a rotating direction of the inner bath.

12. The metal recovery method according to claim 10, wherein the acid solution and the recovery liquid flow in opposite directions with respect to a rotating shaft direction of the inner bath or the outer bath.

13. The metal recovery method according to claim 10, wherein an acid solution inflow port from which the acid solution is flowed into the inner bath or a recovery liquid inflow port from which the recovery liquid is flowed into the outer bath is arranged inclined with respect to a rotation axis of the inner bath or a rotation axis of the outer bath so that the acid solution or the recovery liquid flows toward an outer circumference of the inner bath or the outer bath.

14. The metal recovery method according to claim 1, wherein a stirring means for stirring the acid solution or the recovery liquid is provided.

15. A metal recovery method comprising:
   a dialysis treatment step of subjecting a positive electrode material containing a composite oxide of lithium and a transition metal element to dialysis treatment in a bath in which an anion selectively permeable membrane for selectively permeating the lithium in the positive electrode material and an acid solution containing halide ions are provided; wherein the dialysis is performed by a process selected from the group consisting of pressure dialysis and centrifugal dialysis.

16. The metal recovery method according to claim 15, wherein the transition metal element is Co.

17. The metal recovery method according to claim 15, wherein the halide ion is Cl—.

18. The metal recovery method according to claim 15, wherein, in the dialysis treatment step, the positive electrode material is separated into a concentrated liquid of lithium and acids obtained by treating the positive electrode material with the acid solution containing halide ions, and a concentrated liquid of transition metal ions of the transition metal element.

19. The metal recovery method according to claim 18, further comprising:
   a step of recovering the acids from the concentrated liquid of lithium and acids separated in the dialysis treatment step; and
   a step of recovering the lithium from a residual liquid of the concentrated liquid of lithium and acids, from which the acids have been recovered through the acid recovery step.

20. The metal recovery method according to claim 19, wherein, in the lithium recovery step, a carbonate is mixed with the residual liquid to generate lithium carbonate, thereby recovering the lithium.

21. The metal recovery method according to claim 15, wherein the acid solution is a strong acid.

22. A dialysis device comprising:
a first bath;
a second bath;
an acid solution inflow port from which an acid solution containing lithium ions and transition metal ions is flowed into the first bath;
a recovery liquid inflow port from which a recovery liquid is flowed into the second bath;
an anion permeable membrane which is provided between the first bath and the second bath, through which the lithium ions are permeated from the acid solution which resides on a membrane surface on the side of the first bath to the recovery liquid which resides on a membrane surface on the side of the second bath;
an acid solution outflow port from which the acid solution is flowed out of the first bath; and
a recovery liquid outflow port from which the recovery liquid, in which the lithium ions have been dissolved by dialysis, is flowed out of the second bath;
wherein the first bath is provided inside the second bath and relatively rotatable with respect to the second bath.

23. A dialysis device comprising:
a first tank;
a second tank;
an acid solution inflow port from which an acid solution containing lithium ions and transition metal ions is flowed into the first tank;
a recovery liquid inflow port from which a recovery liquid is flowed into the second tank;
an anion permeable membrane which is provided between the first tank and the second tank, through which the lithium ions are permeated from the acid solution which resides on a membrane surface on the side of the first tank to the recovery liquid which resides on a membrane surface on the side of the second tank;
an acid solution outflow port from which the acid solution is flowed out of the first tank; and
a recovery liquid outflow port from which the recovery liquid, in which the lithium ions have been dissolved by dialysis, is flowed out of the second tank;
wherein the first tank is a pressure dialysis tank.

* * * * *